US008870067B2

(12) United States Patent
Schroeter et al.

(10) Patent No.: US 8,870,067 B2
(45) Date of Patent: Oct. 28, 2014

(54) IDENTIFICATION DEVICE HAVING ELECTRONIC KEY STORED IN A MEMORY

(75) Inventors: Klaus Schroeter, Berlin (DE); Ho B. Chang, Horw (CH)

(73) Assignee: ASMAG-Holding GmbH, Gruenau im Almtal (AU)

( * ) Notice: Subject to any disclaimer, the term of this patent is extended or adjusted under 35 U.S.C. 154(b) by 0 days.

(21) Appl. No.: 12/998,299

(22) PCT Filed: Oct. 7, 2009

(86) PCT No.: PCT/AT2009/000388
§ 371 (c)(1),
(2), (4) Date: Jun. 1, 2011

(87) PCT Pub. No.: WO2010/040162
PCT Pub. Date: Apr. 15, 2010

(65) Prior Publication Data

US 2011/0220716 A1 Sep. 15, 2011

(30) Foreign Application Priority Data

Oct. 7, 2008 (AT) ................................ A 1570/2008

(51) Int. Cl.
*G06K 5/00* (2006.01)
*H04L 9/32* (2006.01)
*G07C 9/00* (2006.01)

(52) U.S. Cl.
CPC ........ *G07C 9/00087* (2013.01); *G07C 9/00031* (2013.01); *G07C 2209/41* (2013.01)
USPC .......................................... 235/380; 713/176

(58) Field of Classification Search
USPC .......................................... 235/380; 713/176
See application file for complete search history.

(56) References Cited

U.S. PATENT DOCUMENTS

| | | | | |
|---|---|---|---|---|
| 4,879,747 A | | 11/1989 | Leighton et al. | |
| 5,878,137 A | * | 3/1999 | Ippolito et al. | 713/172 |
| 6,085,322 A | * | 7/2000 | Romney et al. | 713/176 |
| 6,883,716 B1 | | 4/2005 | De Jong | |

(Continued)

FOREIGN PATENT DOCUMENTS

| | | |
|---|---|---|
| CN | 101061494 A | 10/2007 |
| DE | 199 06 388 | 8/2000 |
| EP | 0 334 616 | 9/1989 |
| WO | WO 2008/000764 A1 | 1/2008 |

OTHER PUBLICATIONS

International Search Report of PCT/AT2009/000388, Jan. 26, 2010.

(Continued)

*Primary Examiner* — Thien M Le
*Assistant Examiner* — Toan Ly
(74) *Attorney, Agent, or Firm* — Collard & Roe, P.C.

(57) ABSTRACT

An identification device for identifying persons on an authenticated basis includes a support layer, an authentication device with a non-volatile, re-writeable semiconductor memory, a person-related feature, a communication system with a communication connector, and a first electronic key which is linked to the person-related feature and is stored in the memory. In a further aspect, an identification device for identifying persons on an authenticated basis includes an electronic data set in which an electronic image of a person-related feature and a first electronic key are stored, and the first electronic key is linked to the person-related feature. Also provided is a method of identifying and authenticating a person by an identification device.

20 Claims, 4 Drawing Sheets

(56) References Cited

U.S. PATENT DOCUMENTS

| | | | | |
|---|---|---|---|---|
| 7,246,097 | B2 * | 7/2007 | Movalli et al. | 705/59 |
| 8,538,067 | B2 | 9/2013 | Launay et al. | |
| 2002/0049908 | A1 | 4/2002 | Shimosato et al. | |
| 2003/0234719 | A1 | 12/2003 | Denison et al. | |
| 2005/0132194 | A1 | 6/2005 | Ward | |
| 2006/0136997 | A1 | 6/2006 | Telek et al. | |
| 2007/0064940 | A1 * | 3/2007 | Moskowitz et al. | 380/205 |
| 2007/0182154 | A1 * | 8/2007 | Hoeppner et al. | 283/72 |
| 2007/0204162 | A1 | 8/2007 | Rodriguez | |
| 2007/0269043 | A1 | 11/2007 | Launay et al. | |
| 2008/0072423 | A1 * | 3/2008 | Finn | 29/854 |
| 2008/0144947 | A1 * | 6/2008 | Alasia et al. | 382/232 |

OTHER PUBLICATIONS

International Standard ISO/IEC 7810. Identification cards—Physical characteristics, Third edition, Nov. 1, 2003, 17 pages, (Spec, p. 17).

International Standard ISO/IEC 14443. Identification cards—Contactless integrated circuit card(s)—Proximity cards—Part 1: Physical characteristics, Nov. 4, 2005, 9 pages, (Spec, p. 17).

IC Card Business yearbook, Mar. 2006, pp. 52-55.

* cited by examiner

IDENTIFICATION DEVICE HAVING ELECTRONIC KEY STORED IN A MEMORY

CROSS REFERENCE TO RELATED APPLICATIONS

This application is the National Stage of PCT/AT2009/000388 filed on Oct. 7, 2009 which claims priority under 35 U.S.C. §119 of Austrian Application No. A 1570/2008 filed on Oct. 7, 2008, the disclosure of which is incorporated by reference. The international application under PCT article 21(2) was not published in English.

The invention relates to a personal identification means for identifying persons on an authenticated basis, comprising a support layer, an authentication device with a memory means provided in the form of a non-volatile, re-writeable semiconductor memory, a person-related feature and a communication system with a communication connector. The invention further relates to an identification means for identifying persons on an authenticated basis, comprising an electronic data set in which an electronic image of a person-related feature and a first electronic key are stored. The invention also relates to a method of identifying and authenticating a person by means of an identification means.

Identification means for identifying a person are generally known and are usually based on an optical check for a match between personal data stored in the identification means and the features of a person who carries the identification means with him and presents it to an inspection authority. This check for a match is usually carried out by a person, although systems are also known whereby an identification means can be at least partially read and processed by an automated system. In the case of the optically visual comparison check made by a person, there is a major drawback to the known information features because it is possible for a potential attacker to forge a feature of this type and thus manipulate a valid identification means so that it can be used by another person with fraudulent intent. Furthermore, the evaluation criteria used for the match depend to a certain extent on a partially subjective evaluation of a person and in particular are also dependent on the respective conditions at the time. An objective check can therefore not be guaranteed.

Accordingly, the underlying objective of the invention is to propose an identification means by means of which the identity and authenticity of a person can be unambiguously guaranteed.

The objective is achieved by the invention due to the fact that a first electronic key linked to the person-related feature is stored in the memory means of the identification means.

This embodiment advantageously ensures that the person-related feature is largely protected against manipulation because a potential attacker would have to manipulate both the person-related feature and the link and optionally the first electronic key in order to be successful. Since the first electronic key is stored in the memory means and hence in the authentication device, a potential attacker would therefore have to manipulate the authentication device, of which there is very little prospect of success in spite of an extraordinary amount of effort.

The first electronic key may be provided in the form of a pseudo-random code, for example an alphanumeric code. Such keys can be generated in a defined manner by means of an algorithm but give an observer the impression of being a random arrangement of characters. In particular, this enables unique specific electronic keys to be generated which cannot be by-passed by a so-called brute-force attack. In particular, the effort that would be needed to check all possible combinations of such a key would exceed the time and technology available to an attacker.

The fact that the person-related feature is linked to the electronic key represents a combination of features which has the advantages of an electronic key in terms of protection against forgery combined with a person-related feature. The identification means is therefore advantageously designed to offer a significant increase in security as regards the unique identification and authentication of a person.

The objective of the invention is also achieved by means of the identification means incorporating an electronic data set, and again in this instance, the first electronic key is linked to the person-related feature. The advantage of this other design resides in the fact that an electronic data set can be directly processed by an automated detection system, which preferably has a data processing unit. In particular, in order to run an identity check, it is not necessary to provide a detection device for establishing a communication connection to the identification means. Another advantage of this design resides in the fact that the identification feature can be transmitted and subjected to data processing. In particular, this means that there is a large range of known and widely used devices available which can be used to run an identification and/or authentication of a person, based on the stored person-related feature.

Since it may be necessary, for legal or statutory reasons, for a person to carry an identification means with him, the support layer is provided in the form of an identity document in another embodiment. Accordingly, the identification means may be a driver's license for a vehicle, for example, but it could also be based on the design of a travel document for travel crossing borders. To enable the checkpoints to be networked with a view to increasing the reliability of the system for identifying persons, the identification means may also be designed so that it can be processed by means of an automated detection system. In particular, the person-related feature may satisfy the requirements of a machine-readable detection process. For example, in the case of an optical system for detecting a person-related feature, the latter can be designed in such a way that feature components are applied to different spectral components. This means that it is not only possible to check the person-related feature in the optically visible range, for example, but feature components can also be created in the non-visible range and detected for comparison purposes, for example in the IR and UV range. The design based on a machine-readable identity document has another advantage in that the check on the person-related feature is always run on the basis of the same reproducible criteria and any element of uncertainty due to individual evaluation criteria applied by an authorizing person can be ruled out.

Of particular advantage is an embodiment whereby the support layer is designed as a bank-type data card, in which case a design based on a chip card is particularly preferred. the claimed embodiment offers a specific advantage in that a bank card is particularly compact and can thus be carried permanently by a person without restricting freedom of movement due to size and/or shape. In particular, the advantage of a design based on a bank card is that it can be carried in an object which a person usually always carries with him, for example a wallet. The support layer may also be provided in the form of a portable data memory, for example a USB stick or a memory card, of a type known to the skilled person. Due to technical progress, such portable data memory devices are becoming ever smaller but ever more powerful and therefore offer increasingly large storage capacities. For this reason, these portable data memory devices are already carried by a large number of users and can therefore advantageously be used as the support layer for the identification means proposed by the invention.

Based on one embodiment, the person-related feature is provided in the form of a person's image. A person's image, in particular a photograph, enables a very rapid check for a match between the person-related feature and the person physically presenting the identification means. Due to the link to the first electronic key proposed by the invention, person-related features of this type can advantageously be improved so that a simple and rapid visual comparison is possible but it would be extremely difficult to manipulate the person-related feature and identification means.

An image of the person-related feature is preferably disposed on the support layer. The advantage of this is that a rapid visual check of the person can be undertaken by comparing the image with the person physically present.

With a view to ensuring reliable detection and hence identification and authentication of a person by means of an image of him or her, one embodiment offers a quite specific advantage in that the image conforms to an internationally recognized standard governing the imaging of persons. The requirements of the International Civil Aviation Organization (ICAO) are used by preference. The ICAO specifically stipulates how a person's face should be photographed and specifies requirements to be complied with relating to the facial expression of the person. As a result of this internationally accepted standardization, it is possible to process images of people on an automated basis, for example. Another major advantage resides in the fact that conforming to international standards ensures universal acceptance and standard comparison features can therefore be used worldwide.

In addition to a using a person's image as the person-related feature, the person-related feature might also be a biometric feature, the advantage of which is that biometric features are extremely difficult or impossible to manipulate and thus offer a particularly high degree of security with respect to identifying and authenticating persons. The biometric feature might be a fingerprint, an iris image, a skin or vein structure or alternatively the voice. The biometric feature is converted into an electronic format so that it can be stored on an identification means proposed by the invention.

In terms of the security of the identification means, one embodiment is of particular advantage whereby the first key is provided in the form of a key of an authentication and certification facility. Such facilities are usually internationally recognized organizations which set a very high standard in terms of issuing and managing electronic keys. Of crucial importance, however, is the fact that such facilities issue and manage keys independently of other organizations and thus guarantee a very high degree of independence and hence a very low degree of external influence. For example, the first electronic key may be part of a so-called Public Key System, in which case one key part is publicly known but the private key part is known only to the user of the authentication and certification facility.

For example, the first electronic key and the link may be configured so that a potential attacker would irreversibly destroy the first key or the link in the event of an attempt at manipulation.

Since the first key and the person-related feature are stored in the memory means of the authentication device, it is of advantage if the authentication device has a data processing unit or a cryptography module because this means that direct access to the stored features can be prevented. For security reasons, it is particularly practical if an external checking device, for example an automated personal identification facility, does not have direct access to the stored key, person-related feature or link. As a result of the claimed embodiment, the stored features can be encrypted in such a way that a potential attacker would gain no advantage. This design has a particular advantage in that the stored features can be kept largely hidden, thereby preventing the possibility of fraudulent access. For example, the electronic key can be encrypted by means of a one-way encryption algorithm. When accessing the identification means in order to check the person-related feature, the personal identification facility of the authentication device must present the correct key result in order to gain machine access to the identification means. In the event of a brute-force attack, an attempt is made to gain access by trying out possible key results. After several incorrect access attempts with a false key result, the authentication device can activate a protection mechanism which completely blocks access, for example, making a new link of the first electronic key to the person-related feature necessary. However, it would also be possible for the authentication device to render the identification means unusable, for example by destroying the first key and/or person-related feature.

With a view to making use and deployment of the identification means proposed by the invention as user-friendly as possible, one embodiment is of advantage whereby the communication connector may be designed to establish a wireless connection. This being the case, it is possible for a user carrying the identification means proposed by the invention to walk past a detection device and the detection device communicates wirelessly with the authentication device via the communication system for example, and thus checks or verifies the first key and/or optionally other person-related features for compatibility for example. Particularly in areas through which a large number of people pass, this design offers a specific advantage in that the flow of people is not slowed down by having to show the identification means. People pass the detection system, which reads the relevant features and runs an automated identification or authentication of the people.

In one embodiment, the detection device could be connected to a data processing unit for example, which, after reading and checking the first electronic key, accesses a central data storage facility from where it reads stored reference data of the identification means. These reference features can then be displayed to an inspector who compares these features with those of the person currently present.

In terms of reliably authenticating and identifying a person, the security of the identification means can be increased if a second electronic key is stored. Based on a first embodiment, it may be stored in the memory means of the authentication device or, based on a second embodiment, in the electronic data set. This second electronic key is independent of the first electronic key and thus enables an additional security feature of another authentication and certification facility to be stored on the identification means. When checking the identification means proposed by the invention, a control center has the possibility of being able to check two electronic keys independently of one another, thereby identifying and authenticating a person with a higher degree of security. This embodiment also makes it much more difficult for a potential attacker to manipulate the identification means proposed by the invention because he would now have to manipulate two electronic keys at the same time and in a defined manner in order to obtain a false identity.

A particularly advantageous embodiment is obtained if the second key is linked to the first key, because there is then a unique and irreversible link between the two keys, which is of particular practical advantage in terms of reliability in the process of identifying and authenticating a person. This also makes a potential manipulation attempt much more difficult. The link may be set up in such a way that a key product is created which cannot be reversed for example, in other words it is not possible to trace back to the two key parts from the product of the link.

The link between the person-related feature and the first key may be set up on the basis of a one-way operation whereby it is not possible to track back from the product of the link to the original initial products. In the case of a one-way link, it is specifically only the product of the link that is stored. When identifying or authenticating a person, the link is recreated or generated by an authentication center by means of an appropriate checking algorithm, for example, and is compared with the stored link. This enables a unique match to be checked without having to check the essential specific features relevant to security.

Of particular practical advantage is an embodiment whereby the first and/or second electronic key is provided in the form of an electronic key of a person with legal authority. A person with legal authority might be a lawyer or notary, for example, but in any case a person who can use the power of his legal status to issue a legally binding certificate relating to the authenticity of an identification means. For example, a person would show the identification means to a person of legal authority who, having legitimized the person by storing his own electronic key, would confirm that the identification means has been uniquely assigned to a specific person. The main aspect of this is that this one-off confirmation by a person of legal authority is used to set up a unique and fully traceable assignment of the identification means to a specific person and this unique assignment can be uniquely retrieved during subsequent procedures for identifying or authenticating the person. A third party, having checked the identification means, will then be able to identify and authenticate a person presenting such an identification means in a reliable and unambiguous manner and in particular, it will be possible to obtain a legally binding identification and authentication.

The legal authority might specifically be any organization which is widely accepted as being an entity with the power to issue a recognized and in particular legally binding confirmation relating to the identity of a person. For example, this might also be a nationally and/or internationally operating authorization or certificating facility.

From the point of view of the security of the identification means, one embodiment is of particular advantage whereby a digital image of the person-related feature is stored in the memory means. A potential attacker could manipulate the support layer of the identification means in such a way that a falsified person-related feature could be applied or appended. If a digital image of this feature is stored in the memory means of the authentication device in addition to the person-related feature on the support layer, there is always a reference image available which can be compared with the feature currently disposed on the support layer for a subsequent access with a view to identifying a person, thereby making any attempt at manipulation immediately detectable. This design has a particular advantage in that a so-called offline-authentication of a person is possible because the reference feature to be checked or compared is available on the identification means and there is no need to establish a communication link to a central certification or authorization facility.

By opting for an appropriate access protection system for the authentication device, it is also possible in addition to ensure that access to this reference feature is possible only on the basis of reading and any access that involves writing is prevented by features and security systems of the authentication device. In one embodiment, the authentication device could also be designed so that any access to the stored feature which involved writing would lead to the destruction of the stored information, link and optionally also to the destruction of the identification means.

One particularly practical embodiment is obtained if the first electronic key is stored in the digital image in encoded format. For example, such encoding may be run using steganography, the advantage of which is that the first electronic key is stored in the digital image in such a way that when the stored image is visually observed, the encoded key is not apparent. Also of advantage is the fact that the digital image cannot be manipulated because any attempt at manipulation will automatically render the link between the person-related feature and the first electronic key invalid. This embodiment specifically offers the particular advantage that an encoding method of this type is usually not reversible, in other words it is not possible to remove the encoding, change the person-related feature and then re-run the encoding and linking operation again for manipulation purposes.

Based on one embodiment, the electronic data set is stored in a memory means of a data processing unit. In order to secure the stored electronic data set, the data processing unit may be disposed in a secure area for example, to which only a selected number of persons have access. It would also be possible to store several electronic data sets in the data processing unit. This will enable electronic data sets relating to several persons to be managed.

Another embodiment is of advantage whereby the data processing unit has a communication connector which is configured to enable a remote data center to access the electronic data set. For example, the data processing unit may be provided in the form of a server which stores a plurality of different electronic data sets as identification means and is accessible via a global communication network. A plurality of identification and authentication facilities will then be able to access the identification means and thus run the process of identifying or authenticating persons.

In order to simplify use and make allowance for the fact that the identification means proposed by the invention should preferably be carried, one embodiment is of advantage whereby the electronic data set is stored in a portable data memory device. As described above, portable data memory devices already rank as devices which are used in day to day life and are therefore usually carried.

The objective of the invention is also achieved by a method of identifying and authenticating a person, which comprises the method steps described below.

By storing person-related features in a memory means or an electronic data set, an identification means is obtained which can be carried by a user and accessed at any time so that a person can be identified at any time.

In order to ensure that the identity of a person is secure, it is legitimized by a legal authority. This might be done by the person presenting a legally valid document to the legal authority, who documents the identity of the person.

By storing a first key of a legal authority in the memory means of the information feature or the electronic data set and then linking the first key to the person-related feature, a legally valid relationship is established between the physical identification means and the person as being the carrier or owner of this feature.

By presenting the identification means for inspection, the person can then have his identity legally authenticated. When presenting the identification means to a third party, the latter can then assume, in particular on a legally binding basis, that this person unambiguously corresponds to the one to whom this specific identification means was legally assigned before the legal authority.

Based on the first embodiment of the identification means, presenting the identification means may mean that the support layer carried by a person to be checked and/or of a checking device has already been verified. Based on the second embodiment in the form of an electronic data set, the checking device or the person carrying out the check may be presented with a referral to the memory location where the data set is stored, whereupon the identification means can be accessed via a communication route.

In order to increase security or to set up a multi-stage authentication process, it is of advantage to opt for an embodiment whereby a second electronic key of an authentication and certification facility is stored. This embodiment offers a significant increase in the security involved in identifying and authenticating a person because a third party to whom the identification means is presented can run a check by checking the key with the issuing authentication and certification facility to ascertain whether the person presenting the identification means matches the person who applied for the second electronic key. Since such a facility usually has a specifically nationally but preferably internationally recognized reputation, establishing the identity or authenticity of a person is confirmed once by means of the first electronic key which was stored by a legal authority, and a second time by means of the second electronic key of an authentication and certification facility, which represents a considerable advantage in terms of ensuring a reliable identification of persons and makes for wide acceptance of the method proposed by the invention.

This embodiment also offers the possibility of setting up different security stages. For example, in the case of a more simple application that is not critical in terms of security, authentication by means of the second key will suffice. If greater security is necessary, the first key can also be checked.

To obtain a significant increase in the security of the method proposed by the invention in terms of ensuring reliable identification and authentication of a person whilst enabling the method to be run as quickly as possible, it is of advantage to opt for an embodiment whereby a reference set of person-related data is stored in an external memory unit. This external memory unit could be provided in the form of a central data processing unit for example, which is connected to devices so that it is able to read person-related features and electronic keys as well as their encryption products from identification means. For example, the reference set may contain an image of the person-related features of the identification means, thereby permitting access to the original feature set that was linked by the legal authority to the person-related feature during the legitimization process in order to authenticate a person at any time. A potential attacker could manipulate the identification means but would have no access to the stored reference set so that the manipulation attempt would come to light immediately the next time the method is run to authenticate a person. For the purpose of authenticating a person, therefore, there is always a reference set available which is impossible or extremely difficult to manipulate, thereby resulting in a significant increase in the security and reliability of the process of identifying a person for a third party.

Also with a view to increasing reliability and acceptance of the method proposed by the invention, an embodiment which is of advantage is one where a reference set of person-related data is stored on the identification means, in particular in the memory means. This embodiment is of particular advantage if a detection system is operated “offline”, in other words there is no direct access to a central management facility.

In some embodiments, this reference set may naturally be stored in an appropriately encrypted or encoded format, for example by means of a one-way encryption, which represents a further security hurdle for a potential attacker to overcome.

Based on one embodiment, the stored person-related feature is compared with a detected feature in order to identify and authenticate a person. This embodiment advantageously ensures that the identification means proposed by the invention has sufficient feature security to enable a person to be reliably identified and/or authenticated on the basis of detecting a feature and comparing it with the stored feature. This comparison may be made by an inspector in person and/or an automated control system, and this check will specifically be made if a person carrying an identification means or presenting a reference hands it to a third party and would like to identify and authenticate himself. A detection system can then detect the person-related features, transmit them to a processing facility or control person, so that the currently detected data can be compared with the stored reference data. A match will ensure that the person who is currently physically present matches the one for whom the identification means was confirmed or issued by a legal authority.

A particularly effective increase in the security of the identification means is obtained by an embodiment in which the person-related feature is linked to the first electronic key immediately on detection. This unambiguously ensures that the person-related feature cannot be manipulated between detection, storage and linking.

Another particularly effective increase in security can be obtained with respect to detection of the person-related feature for storing and linking it to the first electronic key if the person-related feature is detected in real time in front of or by the legal authority, thereby unambiguously confirming the authenticity of the detected person-related feature. Since the person-related feature is the main feature of the identification means, this embodiment represents a particularly effective increase in security because the detected feature is detected under supervision and is stored and linked to the key without any possibility of manipulation.

To provide a clearer understanding, the invention will be explained in more detail below with reference to the appended drawings.

These are highly schematic, simplified diagrams illustrating the following:

Figure 1:
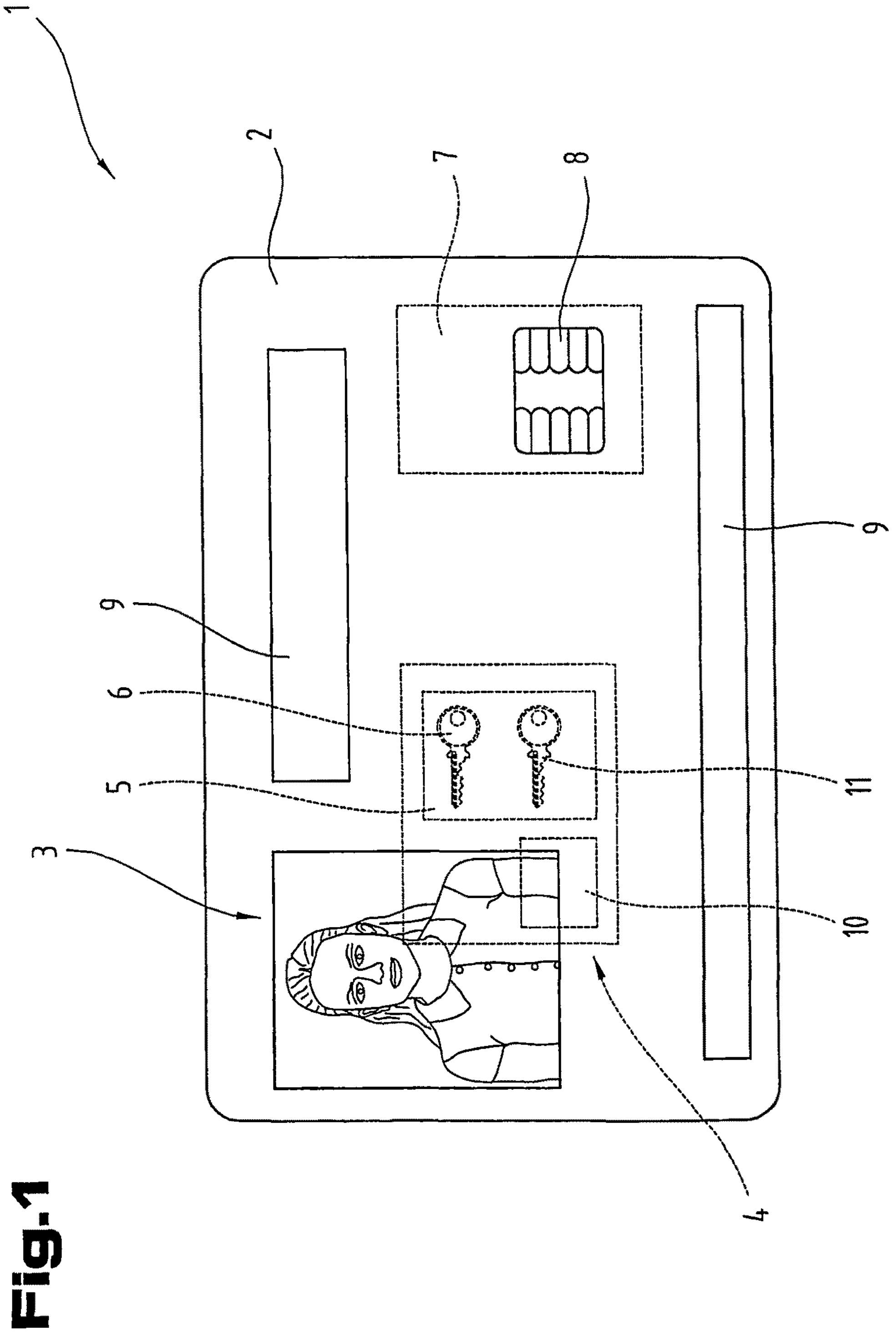
FIG. 1 illustrates an embodiment of the identification means proposed by the invention.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described. Individual features or combinations of features from the different embodiments illustrated and described may be construed as independent inventive solutions or solutions proposed by the invention in their own right.

All the figures relating to ranges of values in the description should be construed as meaning that they include any and all part-ranges, in which case, for example, the range of 1 to 10 should be understood as including all part-ranges starting from the lower limit of 1 to the upper limit of 10, i.e. all part-ranges starting with a lower limit of 1 or more and ending with an upper limit of 10 or less, e.g. 1 to 1.7, or 3.2 to 8.1 or 5.5 to 10.

FIG. 1 illustrates one embodiment of the identification means 1 proposed by the invention, comprising a support layer 2, a person-related feature 3, in particular an image of the person, as well as an authentication device 4 with a memory means 5 in which a first electronic key 6 is stored. The identification means 1 additionally has a communication system 7 with a communication connector 8. Yet other person-related or institutional features 9 may also be disposed on and/or integrated in the identification means 1.

The identification means 1, in particular the support layer, is preferably designed as an identity document intended to give a person carrying this identification means access or entrance to areas or information that are not generally accessible. Since the identification means proposed by the invention may be of the type which has to be carried permanently, the support layer is preferably designed in the format of a bank card so that it does not restrict freedom of movement or run the risk of structural damage to the identification means due to a person's movements. In particular, the format based on a bank card has an advantage in that the identification means can be placed in an identity card case or wallet which the person usually carries anyway. A design based on a chip card offers another particular advantage in that such cards are widely used and are therefore available at very little cost and specifically incorporate components or modules which are particularly practical as a means of running the identification and authentication method proposed by the invention and thus do not have to be provided by a detection device for checking identity or authenticity.

In the case of known identification means, there is usually a problem in that the person-related features 3, 9, in particular the image of the person to whom the identification means has been assigned, can be manipulated with fraudulent intent, which means that the identification means can be used to create a false identity. Especially in areas through which a lot of people pass, mistakes can be made by an inspector who has to check a person-related feature visually, which means that an attacker may gain access to sensitive areas under certain circumstances. The specific advantage of the identification means proposed by the invention resides in the fact that the first electronic key 6 is linked to the person-related feature 3 and optionally to another feature 9. The person-related feature 3 is preferably provided in the form of a person's image, the advantage of which is that in addition to a visual comparison of the person presenting the identification means, a comparison can also be made with the stored image 3. The electronic key 6 is linked to the person-related feature 3 by creating an electronic representation of the person-related feature 3, for example, and storing it in the memory means 5 encrypted with the first electronic key 6, for example. However, a preferred embodiment is one where a digital representation of a person's image 3 is stored in the memory means 5 and the digital image is linked to the first electronic key 6 by means of steganography so that the first electronic key is hidden in the digital image. However, it would also be possible for a checksum to be determined from the digital image, for example, which is encrypted with the first electronic key and then hidden in the digital image. These are merely examples of embodiments enabling an electronic key to be linked to a person-related feature. The person skilled in the art will be familiar with other possible ways of linking an electronic key to a person-related feature, preferably in a format which can be electronically processed, to make attempts at manipulation much more difficult. In particular, the fact of linking the first electronic keys 6 to a person-related feature 3 as proposed by the invention has a specific advantage in that if an attempt is made to manipulate the person-related feature 3, the link to the first electronic key 6 is rendered invalid and the attempt at manipulation can be unambiguously detected.

To enable a data communication link to be established between the identification means 1 and a detection system, the identification means has a communication means 7 with a communication connector 8. Based on the preferred embodiment as a bank-type SmartCard, for example conforming to standard ISO/IEC 7810, the disposition of the communication connector 8 on the support layer 2 as well as the design of the support layer itself is fixed. The communication connector 8 may be based on a design requiring contacts or on a wireless design and thus enables the authentication process to be run without the identification means having to be inserted in a detection system. Standard ISO/IEC 14443 stipulates the design of chip cards which can be read without contacts for example.

The authentication device 4 may be designed to make characteristic features of the link between the person-related feature 3 and first electronic key 6 available to a detection system via the communication system 7. However, it would also be possible for the authentication device to compare a person-related feature just detected with the stored person-related feature and transmit the message to the detection system that a match has been found. In this embodiment, no feature of the link or first key is transmitted from the identification means to the outside.

As a means of securing the stored electronic key and an image of the person-related feature which may optionally be stored, the authentication device 4 of one embodiment has a data processing unit or a cryptography module 10. The authentication device 4 may be configured so that the stored features or electronic key are secured in such a way that an attacker who manages to access the stored features or key will not gain any advantage from this access. This is achieved on the basis of a one-way encryption for example, which is run by a cryptography module, and it is not possible to trace back to the original features from the result of the security lock. However, the authentication device is also able to handle complex tasks, for example a multi-stage feature check which may optionally involve detecting person-related features, which is of advantage if the authentication device has a data processing unit because such a device is usually capable or running complex processing steps. In this connection, as described above, a design based on a chip card or SmartCard offers an advantage in that such a data processing unit is usually an integrated part of such a card.

To provide an additional security feature, a second electronic key 11 may be disposed in the memory means 5 of the authentication device 4. The main aspect of the first and/or second electronic key is the fact that it is issued or supplied by an authentication or certification facility and this certification or authorization facility conforms to a high international standard with respect to the reliability of the generated electronic key. In particular, these facilities satisfy specific requirements governing the creation and management of user data used to generate the electronic key.

Figure 2:
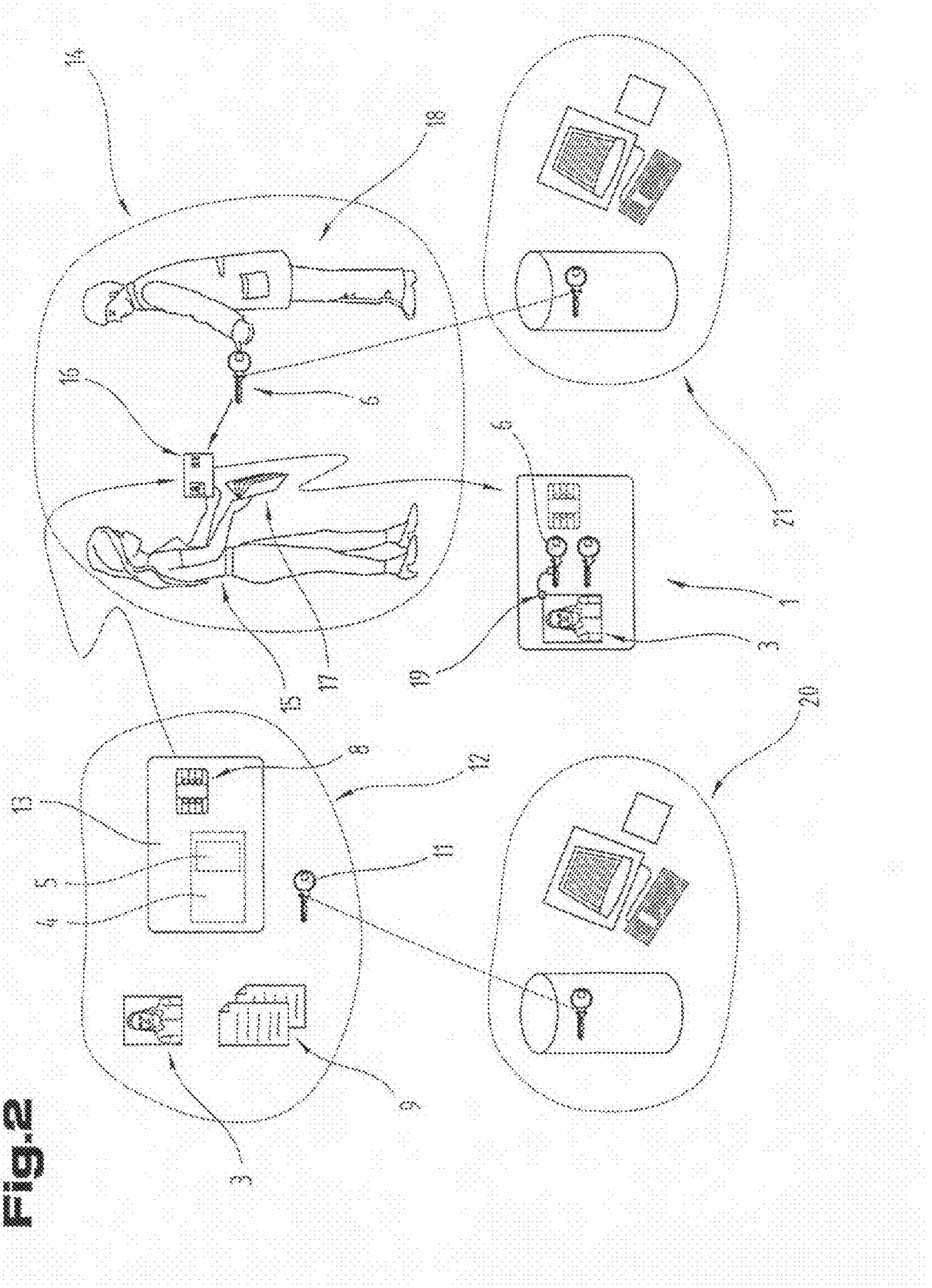
FIG. 2 illustrates the method steps used to create an identification means for uniquely identifying and authenticating a person.

FIG. 2 shows an operating diagram of the method of creating an identification means 1 proposed by the invention which enables a person to be unambiguously identified and authenticated. In a first step 12, an non-personalized identification means 13 is personalized with person-related features 3, 9, in other words the features 3, 9 are applied to or stored in the identification means 13. In a second step 14, the user 15 takes the personalized identification means 16 together with a legally valid document 17 establishing the identity of the person 15 to an authorization body 18. The authorization body 18 is preferably a legal authority, for example a lawyer or notary. The latter checks the identity of the person 15 by means of the presented document 17 and then stores the appropriate first electronic key 6 in the personalized identification means 16, in particular in the memory means, thereby legitimizing it. The essential step of the method proposed by the invention is that the authenticating authority 18 then links the first electronic key 6 stored in the identification means 16 to a person-related feature 3, 9 and thus establishes an irreversible connection 19.

The method steps used to personalize 12 or authorize 14 the identification means require the identification means to be placed in an access control and control system, not illustrated, and the latter may be a data processing unit coupled with a communication system to permit communication, which establishes a data connection to the authentication device 4 via the communication connector 8. The main technical effect of this method proposed by the invention is the fact that an identification means 1 is created which links 19 the person-related feature 3 to a first electronic key 6 in such a way that manipulation of the identification means is largely prevented by this link and a person's identity and authenticity can be unambiguously and legally established.

Personalization 12 of the identification means 13 may also include a step whereby a second electronic key 11 is stored in the memory means 5 of the authentication device 4. The first 6 and optionally second 11 electronic key is preferably supplied and managed by an external certification and authorization facility 20, 21. As explained above, this facility enjoys a high degree of acceptance with regard to the security it applies to generating and managing electronic keys. Examples of such facilities are RSA or VeriSign. These facilities manage a set of electronic keys which is uniquely assigned to a registered user. In this connection, a key set is preferably used in compliance with a so-called Public Key System consisting of a private and a public key. A more detailed description will not be given here because Public Key Systems are known to the skilled person. The advantage of such key systems specifically resides in the fact that they enable third parties to establish the authenticity of an electronic key from an independent certification and authentication device 20, 21.

Figure 3:
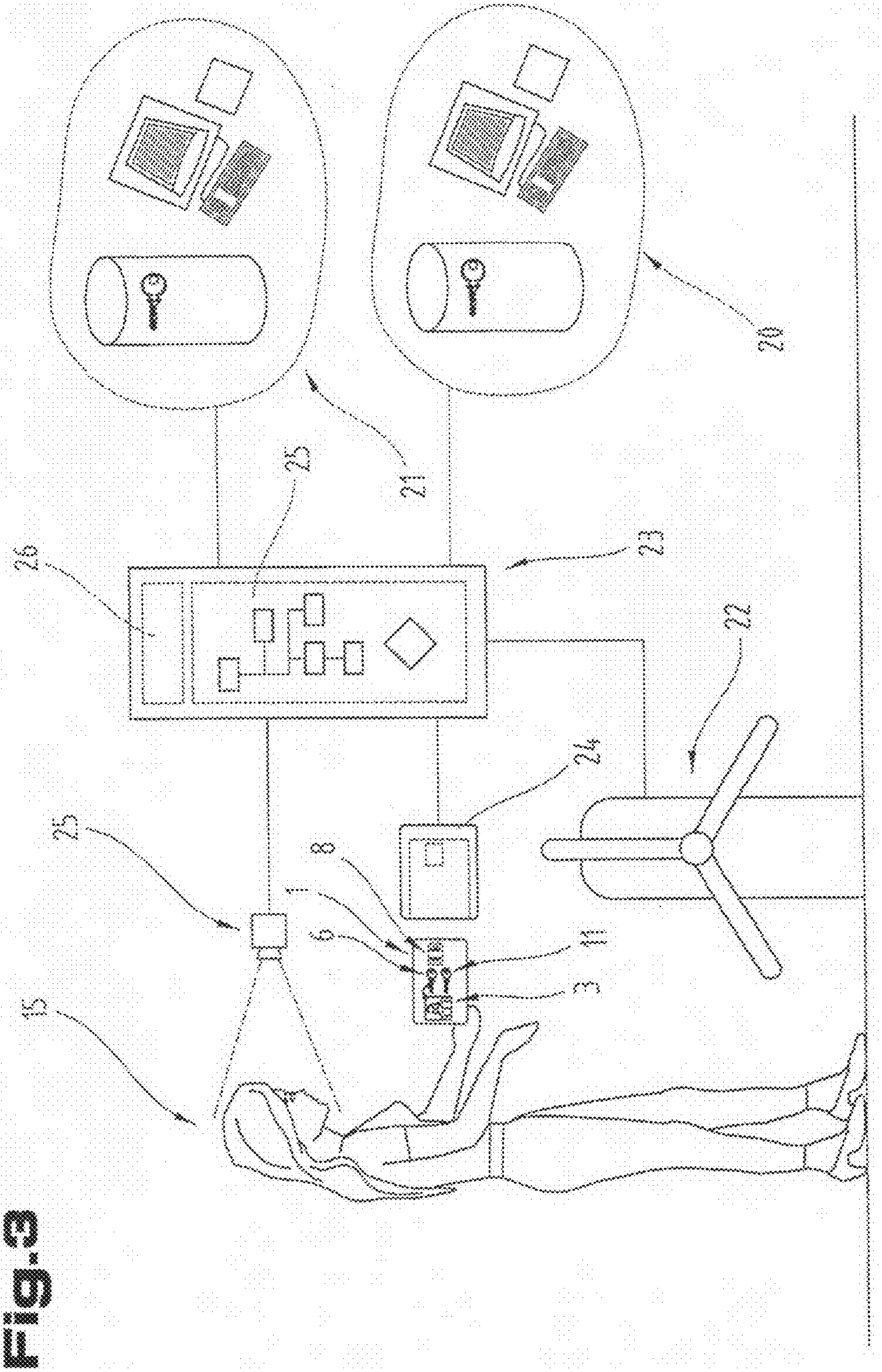
FIG. 3 shows a device used to secure access by checking the identity of a person.

FIG. 3 illustrates an application of the method proposed by the invention used to provide unique identification and authentication of a person 15, by means of the identification means 1 proposed by the invention. For example, access to a facility that is not generally accessible can be secured by means of an access control system 22. In order to release the access control system 22, it is necessary to identify and authenticate a person 15 uniquely. To this end, the person 15 presents the identification means 1 to a detection system 23 which evaluates it. For example, the identification means 1 is placed in a reading device 24 and a communication connection is established to the authentication device via the communication connector 8. The detection system 23 may be configured to run an automated identification and authentication of a person, for example by detecting an image of the person by means of a detection means 25, preferably an optical image detection system, and it is compared with the person-related features stored on the identification means 1 by means of an evaluation and comparison module 26. Since the person-related feature 3 is preferably an image conforming to an internationally recognized standard, in particular conforming to ICAO, the evaluation and comparison module 26 may run a comparison of the currently detected image with the stored person-related feature on a fully automated basis. In order to ensure that the identification means 1 has not been tampered with, the detection system 23 is able to check the validity and authenticity of the first electronic key 6 with an external certification and authorization facility 21. A second electronic key 11 can likewise be checked by another certification and authorization facility 20.

In one embodiment, however, it is also possible for person-related features stored on the identification means 1 not to be read by the detection system 23 and instead, a currently detected image of the person is created and processed, for example by means of a cryptography module 27 of the detection system 23, and is then transmitted to the identification means 1. The authentication device of the identification means 1 then checks to ascertain whether the detected and newly created image of the person matches the stored person-related feature 3 and on this basis generates an authorization signal which is transmitted back to the detection system 23 which then releases the access control system 22.

Figure 4:
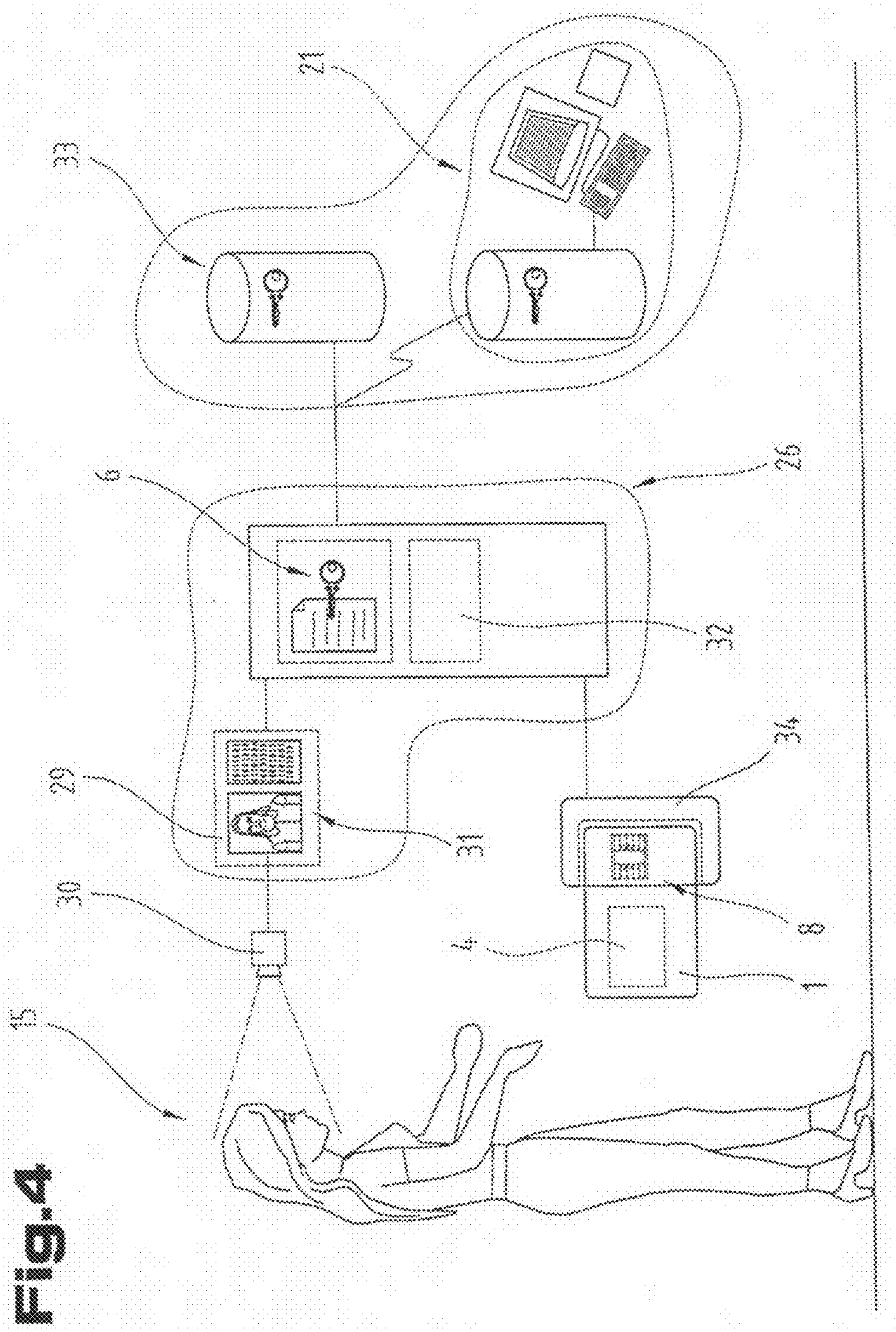
FIG. 4 shows a device for authenticating an identity feature.

FIG. 4 illustrates a device for creating the identification means 1 proposed by the invention, in particular as a means of linking person-related features to a first electronic key and storing them on the identification means. The processing steps needed to personalize and authenticate an identification means are preferably run by means of a data processing unit 28 because a system of this type is widely available and in particular generally offers the facility of processing by means of electronic and digital data units. In particular, such a system has an image processing module 29, which converts an image of a person 15 detected by an image detection unit 30 into a format 31 which can be further processed. The image detection unit 30, for example a camera, is connected to the data processing unit 28 via a communication connector. Since the image must preferably comply with recognized standards for automated image detection, in particular ICAO, the image processing module 29 can control the image detection unit 30 in such a way that the required standard of imaging is obtained. The image processing module preferably converts the detected image data into a standardized image format, which can be processed by a range of different data processing systems.

An essential aspect of the identification means and the method proposed by the invention is the fact that an electronic key which satisfies high standards in terms of security to prevent tampering is linked to the person-related feature, in particular the image. Several examples of ways in which a link can be created are explained below but reference may also be made to the relevant background literature in this technical field for information about methods of linking an electronic key to a person-related feature based on a format which can be processed by a data system. For example, the first electronic key 6 can be placed in digital image data by means of a steganography. The advantage of this is that when person-related features are observed by a person, there are no perceptible impairments and the first electronic key is applied across all the image data. However, another option would be to determine a reference value from the image created, for example a hash value, which is run with the first electronic key through a cryptography module 32 so that a cryptographic result is obtained. This cryptographic result may be set up in such a way that it is not possible to trace back to the original image data and electronic key. The advantage of this approach is that once the identification means has been authenticated by an authority, the person-related feature does not have to be queried again and instead, when subsequently identifying and authenticating a person, an image of the person is detected by a third party and processed by means of the same cryptographic encryption method so that a cryptographic result is obtained. This result can then be compared with the cryptographic result stored on the identification means to enable the identity of the person to be authenticated. The authentication device 4 of the identification means 1 and the memory means of the authentication device may also be configured so that it is only possible for an authority who is the owner of the first electronic key to access stored person-related features in order to process or change them. Based on one advantageous embodiment, the first electronic key 6 may be part of a key system run and/or managed by a certification and authorization facility. This certification and authorization facility may then be part of the data processing unit 28 and connected 33 to it locally. However, it would also be possible to opt for a remote certification and authorization facility 21 to which a communication link can be established by the data processing unit 28 via a public communication medium, for example the Internet. For example, a so-called Public Key System can be used in this instance, in which case the image is linked to its private key and stored on the identification means by the authority during the process of authenticating the identification means. Since a potential attacker never knows the private key of the authority, it is not possible to manipulate the person-related feature because this would also render the link to the first electronic key invalid. A third party can establish the identity and authenticity of a person presenting the identification means due to the fact that the encrypted person-related image is presented to the certification and authorization facility 21 which is able to confirm the authenticity of the person-related feature stored on the identification means on a fully automated basis. By checking the characteristic features of the person physically present against the reference feature stored on the identification means, it is then possible to unambiguously authenticate the identity of the person physically present.

To enable the stored reference features to be accessed, the reference features to be stored and the link made to the first electronic key, the identification means 1 is placed in an access unit 34 and the latter establishes a data connection between the data processing unit 26 and the authentication device 4 of the identification means 1 via the communication system and in particular via the communication connector 8.

The identification means proposed by the invention may be based on another embodiment whereby the assigned person himself authenticates other features. To this end, the person or an image may be detected by means of an image detection unit of a data processing unit and the person authenticates his own identity on the basis of a comparison with the stored feature. In this connection, it is irrelevant whether the identification means is one based on the design using a support layer or one based on an electronic data set. Once an authentication has been successfully completed, the person can create another identification means, for example. A data processing unit of the type widely used generally has all the components needed to run the method steps based on this embodiment.

The embodiments illustrated as examples represent possible variants of the identification means and the method of authenticating and identifying a person, and it should be pointed out at this stage that the invention is not specifically limited to the variants specifically illustrated, and instead the individual variants may be used in different combinations with one another and these possible variations lie within the reach of the person skilled in this technical field given the disclosed technical teaching. Accordingly, all conceivable variants which can be obtained by combining individual details of the variants described and illustrated are possible and fall within the scope of the invention.

For the sake of good order, finally, it should be pointed out that, in order to provide a clearer understanding of the structure of the identification means and method, it and its constituent parts are illustrated to a certain extent out of scale and/or on an enlarged scale and/or on a reduced scale.

The objective underlying the independent inventive solutions may be found in the description.

Above all, the individual embodiments of the subject matter illustrated in FIGS. 1 to 4 constitute independent solutions proposed by the invention in their own right. The objectives and associated solutions proposed by the invention may be found in the detailed descriptions of these drawings.

LIST OF REFERENCE NUMBERS

1 Identification means
2 Support layer
3 Person-specific feature
4 Authentication device
5 Memory means
6 First electronic key
7 Communication system
8 Communication connector
9 Person-specific or institutional feature
10 Data processing unit, cryptography module
11 Second electronic key
12 Identification means personalization
13 Non-personalized identification means
14 Identification means authentication
15 Person
16 Personalized identification means
17 Document
18 Authenticating authority
19 Link
20 Certification facility, authorization facility
21 Certification facility, authorization facility
22 Access control system
23 Detection system
24 Reading device
25 Detection means
26 Evaluation and comparison module
27 Cryptography module
28 Data processing unit
29 Image processing module
30 Image detection unit
31 Processed image data, digital image
32 Cryptography module
33 Local certification facility, authorization facility
34 Access unit

The invention claimed is:

1. Identification means for identifying persons on an authenticated basis, the identification means comprising a support layer, an authentication device with a memory means provided in the form of a non-volatile, re-writeable semiconductor memory, a person-related feature stored in the memory means, a communication system with a communication connector, a first electronic key stored in the memory means, and a second electronic key stored in the memory means, wherein the person-related feature is obtained from a person and is stored in the memory means, wherein the first electronic key is linked to the person-related feature, the first electronic key being issued by a legal authority after the person presents the support layer, with the memory means and with the communication system, the person-related feature being stored in the memory means, to a legal authority, and after the legal authority legitimizes the identity of the person, wherein the second electronic key is stored in the memory means, the second electronic key being independent of the first electronic key and being linked to the first electronic key, wherein the person-related feature is an image of the person, wherein the image satisfies an internationally recognized standard governing the imaging of persons, in particular satisfies the requirements of the ICAO, and wherein when the person presents the identification means to third parties, identity and authenticity of the person is verifiable by the third parties via the identification means.

2. Identification means according to claim 1, wherein the support layer is one selected from the group comprising an identity document, bank-type data card, a portable data memory.

3. Identification means according to claim 2, wherein the authentication device has a data processing unit and a cryptography module.

4. Identification means according to claim 2, wherein the communication connector is designed to operate by wireless communication.

5. Identification means according to claim 2, wherein a digital image of the person related feature is stored in the memory means.

6. Identification means according to claim 5, wherein the first electronic key is stored in the digital image in coded format.

7. Identification means according to claim 1, wherein the person-related feature includes a further biometric feature.

8. Identification means according to claim 1, wherein the first electronic key is a key issued by an authentication and certification facility.

9. Identification means according to claim 1, wherein the link is set up by a one-way operation.

10. Identification means according to claim 1, wherein the second electronic key is an electronic key issued by a legal authority.

11. Identification means for identifying persons on an authenticated basis, the identification means comprising an electronic data set in which an electronic image of a person-related feature, a first electronic key, and a second electronic key are stored, wherein the person-related feature is obtained from a person and is added to the electronic data set, wherein the first electronic key is linked to the person-related feature, the first electronic key being issued by a legal authority after the person presents the electronic data set, with the person-related feature stored therein, to a legal authority and after the legal authority legitimizes the identity of the person, wherein the second electronic key is independent of the first electronic key and is linked to the first electronic key, wherein the person-related feature is an image of a person, wherein the image satisfies an internationally recognized standard governing the imaging of persons, in particular satisfies the requirements of the ICAO, and wherein when the person presents the identification means to third parties, identity and authenticity of the person is verifiable by the third parties via the identification means.

12. Identification means according to claim 11, wherein the electronic data set is stored in a memory means of a data processing unit.

13. Identification means according to claim 12, wherein the data processing unit has a communication connector which is designed to enable a remote data center to access to the electronic data set.

14. Identification means according to claim 11, wherein the electronic data set is stored in a portable data memory.

15. Method of identifying and authenticating a person by means of an identification means, the method comprising the steps of:

storing in a memory means provided in the form of a non-volatile, re-writeable semiconductor memory of the identification means or storing in an electronic data set of the identification means a person-related feature corresponding to a feature of a first person;

presenting via the first person the memory means of the identification means or the electronic data set of the identification means, with the person-related feature stored therein, to a legal authority;

legitimization of the identity of the first person via the legal authority;

storing via the legal authority a first key of the legal authority in the memory means or in the electronic data set;

linking the first key to the person-related feature;

storing a second key of an authentication and certification facility in the memory means or in the electronic data set, the second key being independent of the first electronic key and being linked to the first electronic key;

presenting to a third party via the first person the identification means;

detecting via the third party a person-related feature from the first person; and authenticating the first person via the third party via a comparison of the stored person-related feature and the detected person-related feature and via a verification of at least one of the first key and the second key;

wherein the person-related feature is an image of the first person; and wherein the image satisfies an internationally recognized standard governing the imaging of persons, in particular satisfies the requirements of the ICAO.

16. Method according to claim 15, wherein a reference set of person-related data is stored in an external memory unit.

17. Method according to claim 16, wherein a stored reference set of person-related data is compared with a physically presented person-related data set.

18. Method according to claim 15, wherein a reference set of person-related data is stored on the identification means, in particular in the memory means.

19. Method according to claim 15, wherein the person-related feature is linked to the first electronic key immediately after detection.

20. Method according to claim 19, wherein the person-related feature is detected in real time before or by the legal authority.

* * * * *

UNITED STATES PATENT AND TRADEMARK OFFICE

CERTIFICATE OF CORRECTION

PATENT NO. : 8,870,067 B2
APPLICATION NO. : 12/998299
DATED : October 28, 2014
INVENTOR(S) : Schroeter et al.

It is certified that error appears in the above-identified patent and that said Letters Patent is hereby corrected as shown below:

Title Page, item [73], Assignee: please change “(AU)” to correctly read: --(AT)--.

Signed and Sealed this
Seventeenth Day of February, 2015

Michelle K. Lee
*Deputy Director of the United States Patent and Trademark Office*